US012760751B2

(12) United States Patent
Naulin et al.

(10) Patent No.: US 12,760,751 B2
(45) Date of Patent: Oct. 13, 2026

(54) HYDRAULIC MANIFOLD

(71) Applicant: Faurecia Hydrogen Solutions France, Nanterre (FR)

(72) Inventors: Edouard Naulin, Belfort (FR); Sullivan Icard, Ecole Valentin (FR)

(73) Assignee: Faurecia Hydrogen Solutions France, Nanterre (FR)

( * ) Notice: Subject to any disclaimer, the term of this patent is extended or adjusted under 35 U.S.C. 154(b) by 0 days.

(21) Appl. No.: 19/038,843

(22) Filed: Jan. 28, 2025

(65) Prior Publication Data

US 2025/0243882 A1 Jul. 31, 2025

(30) Foreign Application Priority Data

Jan. 31, 2024 (FR) ...................................... 2400947

(51) Int. Cl.
*F15B 13/08* (2006.01)

(52) U.S. Cl.
CPC .. *F15B 13/0807* (2013.01); *F17C 2205/0142* (2013.01)

(58) Field of Classification Search
CPC ... F15B 13/0807; F15B 13/0878–0896; Y10T 137/4673; Y10T 137/469; Y10T 137/877; Y10T 137/87716; Y10T 137/4807; Y10T 137/4857; B60K 15/03006; B60K 2015/03315; F17C 5/06; F17C 1/005; F17C 13/045; F17C 2227/042; F17C 2221/012; F17C 2260/025; F17C 2270/0178; F17C 2250/032; F17C 2227/0157; F17C 2201/054; F17C 2223/0123; F17C 2250/01; F17C 2225/0123; F17C 2250/0626; F17C 2225/036; F17C 2205/013; F17C 2270/0184; F17C 2205/0364;
(Continued)

(56) References Cited

U.S. PATENT DOCUMENTS 2,490,839 A * 12/1949 Shaffer .................... B23K 5/22
239/722
3,464,447 A * 9/1969 Jones ...................... F16K 11/22
137/883
(Continued)

FOREIGN PATENT DOCUMENTS

CN 215335774 U 12/2021
EP 3680543 A1 7/2020
(Continued)

OTHER PUBLICATIONS

Preliminary Search Report for French Application No. 2400947 dated Jun. 25, 2024.

*Primary Examiner* — Craig J Price
(74) *Attorney, Agent, or Firm* — Carlson, Gaskey & Olds, P.C.

(57) ABSTRACT

A hydraulic manifold fluidly connects at least two series of tanks. The hydraulic manifold includes at least one filling inlet, at least one emptying outlet, a filling pipe, an emptying pipe, and the same number of branch pipes as there are series of tanks. The branch pipe comprises, at a branch pipe inlet, a connection to the filling pipe via an upstream non-return valve. The branch comprises, at a branch pipe outlet, a connection to the emptying pipe via a downstream non-return valve.

7 Claims, 4 Drawing Sheets

(58) Field of Classification Search

CPC ........ F17C 2205/0142; F17C 2223/033; F17C 2223/0161; F17C 2265/065; F17C 2223/036; F17C 2250/0636; F17C 2227/043; F17C 2227/0185; F17C 2250/0631; F17C 2221/011; F17C 2221/031; F17C 2221/033; F17C 2250/043; Y02E 60/32

USPC ....... 137/255, 256, 263, 861, 613, 883, 266; 141/54

See application file for complete search history.

(56) References Cited

U.S. PATENT DOCUMENTS

| | | | | | |
|---|---|---|---|---|---|
| 4,139,019 | A * | 2/1979 | Bresie | F17C 5/002 | 48/190 |
| 5,603,360 | A * | 2/1997 | Teel | F17C 9/00 | 137/267 |
| 5,673,735 | A * | 10/1997 | Crvelin | F17C 13/045 | 141/54 |
| 6,089,263 | A * | 7/2000 | Dumser | G01F 1/28 | 137/563 |
| 6,112,760 | A * | 9/2000 | Scott | F17C 13/084 | 137/255 |
| 6,260,580 | B1 * | 7/2001 | Shipley | A23B 2/82 | 426/524 |
| 7,216,672 | B1 * | 5/2007 | Chen | F16L 41/16 | 251/149.8 |
| 7,243,684 | B1 * | 7/2007 | Chen | F16K 15/18 | 251/149.8 |
| 7,325,568 | B2 * | 2/2008 | Williams | F16K 27/003 | 239/DIG. 15 |
| 7,905,252 | B2 * | 3/2011 | Neumann | F17C 13/084 | 137/884 |
| 8,555,926 | B2 * | 10/2013 | MacDuff | F24D 19/1015 | 74/129 |
| 8,925,588 | B2 * | 1/2015 | Womack | F17D 1/20 | 118/715 |
| 8,950,429 | B2 * | 2/2015 | Oike | F16T 1/48 | 137/554 |
| 8,997,789 | B2 * | 4/2015 | Pozniak | F17D 5/02 | 137/215 |
| 9,038,665 | B2 * | 5/2015 | Cheng | F16K 11/24 | 137/883 |
| 9,714,739 | B2 * | 7/2017 | Killeen | F16K 11/0856 | |
| 10,794,536 | B2 * | 10/2020 | Adkins | F17C 3/08 | |
| 11,530,782 | B2 * | 12/2022 | Francois | F17C 1/005 | |
| 12,449,095 | B2 * | 10/2025 | Hodgson | F17C 5/06 | |
| 2004/0007276 | A1 * | 1/2004 | Sugg | B67D 1/08 | 137/883 |
| 2007/0215209 | A1 * | 9/2007 | Street | F17C 5/06 | 137/263 |
| 2009/0308474 | A1 * | 12/2009 | Igarashi | F16K 27/003 | 137/861 |
| 2010/0095890 | A1 * | 4/2010 | Gebele | G05D 16/204 | 137/12 |
| 2011/0146798 | A1 * | 6/2011 | Hutton | F16K 11/20 | 137/861 |
| 2012/0312404 | A1 * | 12/2012 | Choi | F16L 37/0927 | 137/883 |
| 2015/0070182 | A1 * | 3/2015 | Conner | G05D 16/107 | 137/535 |
| 2020/0217456 | A1 * | 7/2020 | Francois | F17C 1/005 | |

FOREIGN PATENT DOCUMENTS

| | | | |
|---|---|---|---|
| JP | 2003172497 | A | 6/2003 |
| WO | 2023147830 | A1 | 8/2023 |

* cited by examiner

[Fig 1]
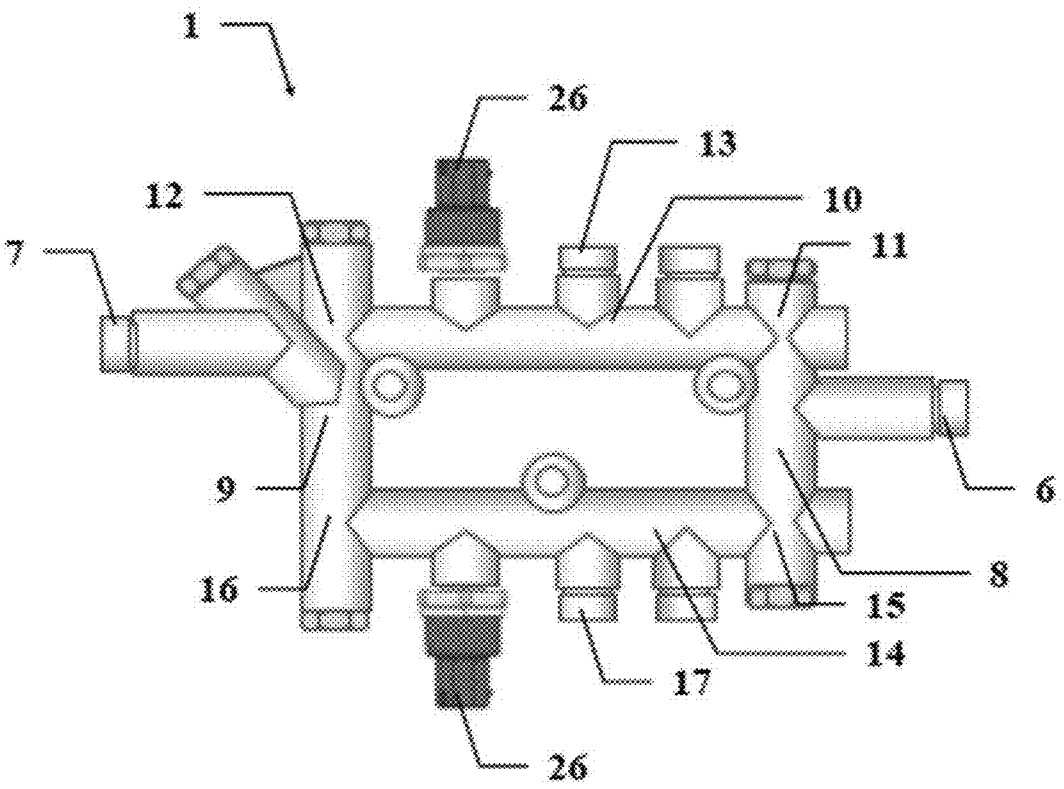

[Fig 2]
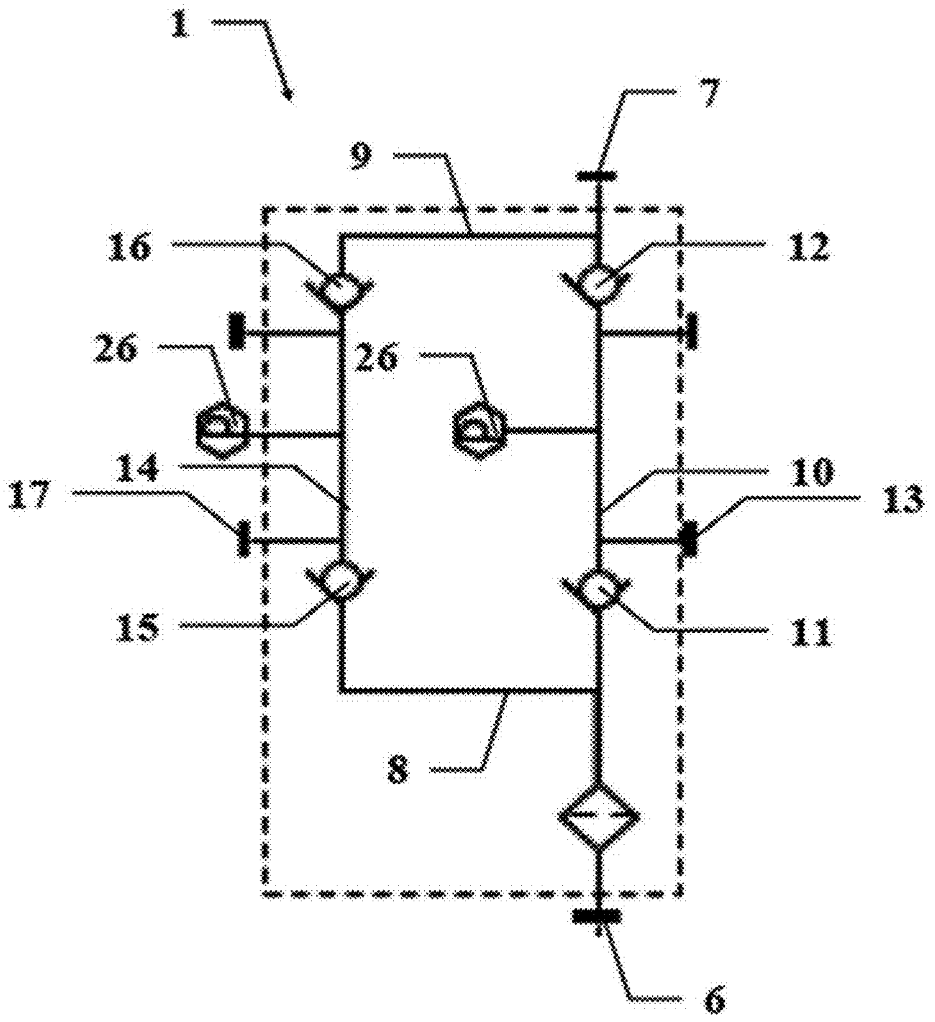

[Fig 3]
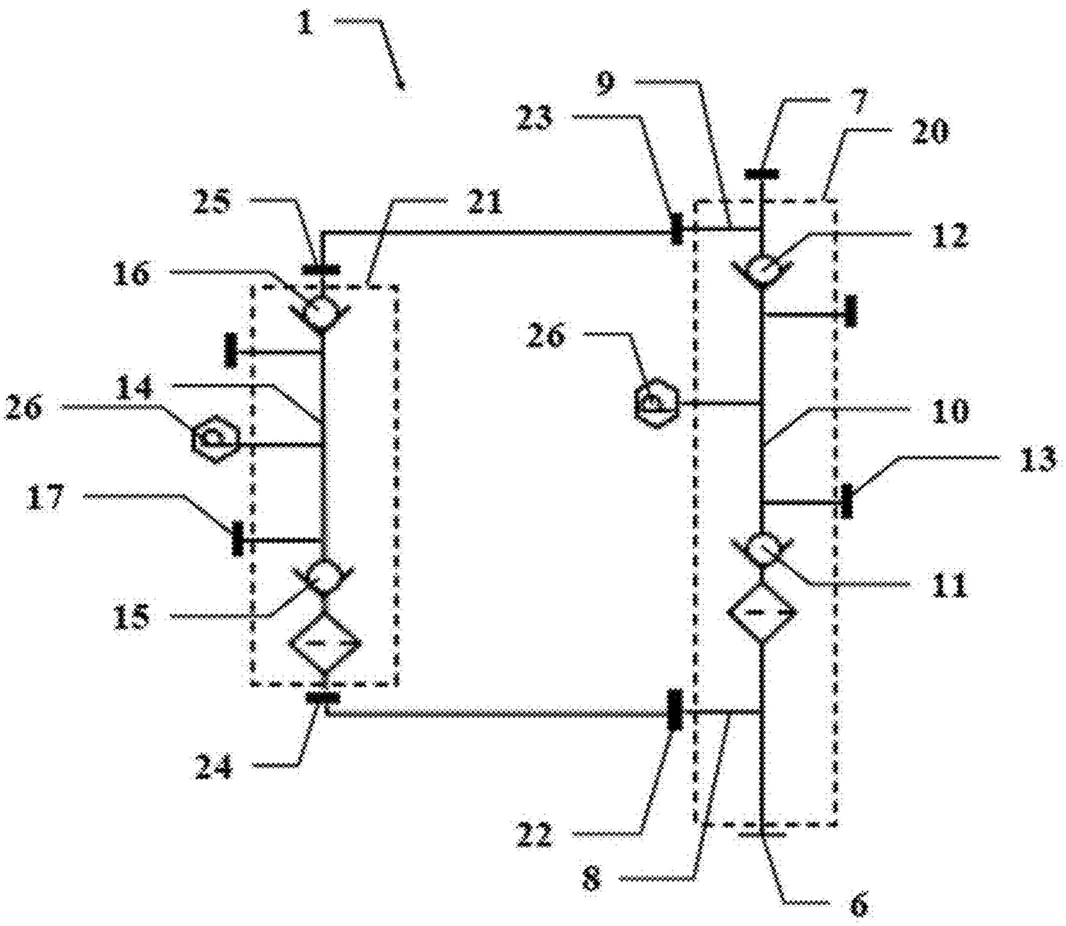

[Fig 4]
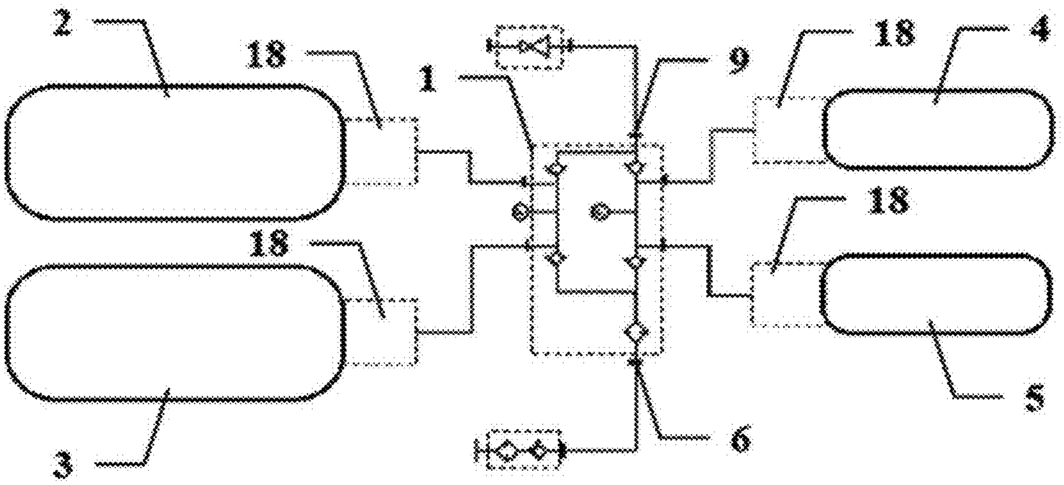

HYDRAULIC MANIFOLD

CROSS-REFERENCE TO RELATED APPLICATION

This application is a U.S. non-provisional application claiming the benefit of French Application No. 2400947, filed on Jan. 31, 2024, which is incorporated herein by reference in its entirety.

TECHNICAL FIELD

The disclosure relates to a hydraulic manifold, of the type suitable for placing a plurality of tanks, particularly pressurized gas, more particularly hydrogen, tanks in communication to pool and centralize the filling and/or emptying of said tanks.

BACKGROUND

It is known practice to connect a plurality of elementary tanks to a manifold to pool and centralize the filling and emptying of the tanks, in order to form a large modular overall tank.

A valve, preferably a solenoid valve, is generally fitted at the inlet of each elementary tank, so that an elementary tank can be isolated from the overall tank and so as to control which of the one or more elementary tanks is emptied.

As is known, a manifold forms a common mixing volume to which the various tanks are connected.

It is common practice to use a semi-direct solenoid valve at the inlet of an elementary tank. Such a semi-direct solenoid valve is advantageous for its excellent cost/performance ratio. However, when the pressure difference between the upstream side of the solenoid valve, on the tank side, and the downstream side of the solenoid valve, on the manifold side, is very high, it can be difficult to open the solenoid valve, which either struggles to open completely or refuses to open, even though the electrical control unit is requesting opening. Such a pressure difference may arise either as a result of a significant difference in the filling and/or emptying of one tank relative to the others, or as a result of thermal stresses to which the tanks are not equally subjected, as a result of their different respective thermal characteristics and/or dimensions.

In addition, it is desirable to have a hydraulic manifold that makes it possible to connect elementary tanks, which may be different, and to compartmentalize the pressures between series of tanks of similar respective thermal characteristics and/or dimensions, so that the pressure difference between upstream and downstream of a solenoid valve does not reach excessively high values that could prevent it from opening correctly.

SUMMARY

In one example implementation, the disclosure relates to a hydraulic manifold that fluidly connects at least two series of tanks, wherein the hydraulic manifold comprises: at least one filling inlet and at least one emptying outlet; a filling pipe; an emptying pipe; and a same number of branch pipes as there are series of tanks; the filling pipe comprising a connection to said at least one filling inlet and a connection to an inlet of each of the branch pipes; the emptying pipe comprising a connection to an outlet of each of the branch pipes and a connection to said at least one emptying outlet; a first branch pipe comprising, at its inlet, a connection to the filling pipe, via a first upstream non-return valve, going in the direction from the filling pipe to the first branch pipe and, at its outlet, a connection to the emptying pipe via a first downstream non-return valve, going in the direction from the first branch pipe to the emptying pipe and further comprising, between the first upstream non-return valve and the first downstream non-return valve, at least one first connection to a tank of the first series; and at least one second branch pipe comprising, at its inlet, a connection to the filling pipe via a second upstream non-return valve, going in the direction from the filling pipe to the second branch pipe and, at its outlet, a connection to the emptying pipe via a second downstream non-return valve, going in the direction from the second branch pipe to the emptying pipe and further comprising, between the second upstream non-return valve and the second downstream non-return valve, at least one second connection to a tank of said at least one second series.

Particular features or embodiments, usable alone or in combination, are:

- each tank is connected to the hydraulic manifold via a semi-direct solenoid valve;
- a series of tanks groups tanks with similar thermal characteristics together;
- tanks with similar thermal characteristics are tanks with substantially identical diameter-to-length ratios;
- a hydraulic manifold is made in one piece;
- a hydraulic manifold is of modular design, with a base module and at least one add-on module, the base module comprising a filling pipe, an emptying pipe and a first branch pipe, the filling pipe comprising a connection to the filling inlet, a connection to the inlet of the first branch pipe, and a first upstream extension connection, the emptying pipe comprising a connection to the outlet of the first branch pipe, a connection to the emptying outlet, and a first downstream extension connection, the first branch pipe being unchanged, the add-on module comprising an unchanged second branch pipe, further comprising, at its inlet, a second upstream extension connection complementary to the first upstream extension connection and, at its outlet, a second downstream extension connection complementary to the first downstream extension connection;
- a branch pipe comprises a pressure sensor.

BRIEF DESCRIPTION OF THE DRAWINGS

The disclosure will be better understood on reading the following description, given solely by way of example, and with reference to the appended figures in which:

FIG. 1 shows, in perspective view, a manifold according to the disclosure;

FIG. 2 shows, in perspective view, a one-piece manifold according to the disclosure;

FIG. 3 shows, in perspective view, a modular manifold according to the disclosure; and FIG. 4 schematically shows a manifold connected to tanks.

DETAILED DESCRIPTION OF THE DRAWINGS

With reference to FIGS. 1 to 4, the disclosure relates to a hydraulic manifold 1. Such a hydraulic manifold 1 is intended to place at least two series of tanks 2-5 (FIG. 4) in fluid communication. For this purpose, a manifold 1 forms a closed container suitable for holding a fluid, such as a pressurized gas, preferably hydrogen. This container comprises at least one filling inlet 6, so that it can be filled. It further comprises at least one emptying outlet 7, so that it can be emptied.

According to one feature, the manifold 1 further comprises a filling pipe 8, an emptying pipe 9 and the same number of branch pipes 10, 14 as there are series of tanks 2-5. The container is created by connecting the filling pipe 8, emptying pipe 9 and said at least two branch pipes 10, 14, in a sealed manner. The branch pipes 10, 14 are substantially linear pipes, comprising two openings, one at each end, referred to as the inlet and outlet. There is one branch pipe 10, 14 per series of tanks 2-5. The tanks 2-5 are organized in series, with a series comprising from one to n tanks, e.g., tanks 2-5. The branch pipes 10, 14 are connected in parallel by way of the filling pipe 8 and the emptying pipe 9.

The filling pipe 8 comprises a connection to said at least one filling inlet 6. Each filling inlet 6 can be connected to a fluid supplier. The filling pipe 8 further comprises a connection to the inlet of each of the branch pipes 10, 14. The filling pipe 8 can thus be filled via one of its filling inlets 6 and in turn fill the branch pipes 10 and 14 via their respective inlets.

In a dual manner, the emptying pipe 9 comprises a connection to an outlet of each of the branch pipes 10, 14. The emptying pipe 9 further comprises a connection to said at least one emptying outlet 7. Each emptying outlet 7 can be connected to a fluid consumer. The branch pipes 10, 14 can thus supply the emptying pipe 9, which can then deliver fluid via one of its emptying outlets 7.

A first branch pipe 10 comprises, at its inlet, a connection to the filling pipe 8 and, at its outlet, a connection to the emptying pipe 9. In order to isolate and protect the first branch pipe 10, the inlet connection is made via a valve 11, referred to as the first upstream non-return valve 11, since it is located upstream of the first branch pipe 10. This first upstream non-return valve 11 is oriented so as to go in the direction from the filling pipe 8 to the first branch pipe 10. Similarly, the outlet connection is made via a valve 12, referred to as the first downstream non-return valve 12, since it is located downstream of the first branch pipe 10. This first downstream non-return valve 12 is oriented so as to go in the direction from the first branch pipe 10 to the emptying pipe 9.

The first branch pipe 10 further comprises at least one first connection 13 between the first upstream non-return valve 11 and the first downstream non-return valve 12. This at least one first connection 13 fluidly connects a tank 2-5 to the manifold 1. The tanks 2-5 of a first series can thus be connected to the first branch pipe 10.

Said at least one second branch pipe 14 comprises, at its inlet, a connection to the filling pipe 8 and, at its outlet, a connection to the emptying pipe 9. In order to isolate and protect said at least one second branch pipe 14, the inlet connection is made via a valve 15, referred to as the second upstream non-return valve 15, since it is located upstream of the second branch pipe 14. This second upstream non-return valve 15 is oriented so as to go in the direction from the filling pipe 8 to the second branch pipe 14. Similarly, the outlet connection is made via a valve 16, referred to as the second downstream non-return valve 16, since it is located downstream of the second branch pipe 14. This second downstream non-return valve 16 is oriented so as to go in the direction from the second branch pipe 14 to the emptying pipe 9.

Said at least one second branch pipe 14 further comprises, between the second upstream non-return valve 15 and the second downstream non-return valve 16, at least one second connection 17. This at least one second connection 17 allows a tank 2-5 to be fluidly connected to the manifold 1. The tanks 2-5 of a second series can thus be connected to the second branch pipe 14.

This makes it possible to separate, in terms of pressure, the tanks of a first series from the tanks of a second series. Each branch pipe 10, 14 allows tanks 2-5 within a series to be grouped together and to be isolated and protected from the tanks of the other series. The non-return valves 11, 12, 15, 16 separating the branch pipes 10, 14 from one another allow the tanks 2-5 from one series to the next to be protected by preventing high pressure arising in one series from disrupting another, less pressurized series.

Each tank 2-5 is connected to the hydraulic manifold 1 by way of a connection 13, 17 via a solenoid valve 18. Such a solenoid valve 18 makes it possible to isolate the associated tank 2-5 and thus selectively control the filling and/or emptying thereof. According to another feature, this solenoid valve 18 is a semi-direct solenoid valve. A semi-direct solenoid valve 18 is conventionally used as it affords an advantageous cost-to-performance ratio. Such a solenoid valve 18, because it operates in two stages, can remain incompletely open or fully closed in the event of the presence of significant back pressure downstream thereof, i.e. on the manifold 1 side, opposite the tank 2-5. To eliminate such a drawback, it is important to ensure that the pressure downstream of the solenoid valve 18 is not too high, relative to the pressure of the tank 2-5.

When filling or emptying, the pressure between the tanks 2-5 and the manifold 1 is substantially equalized, and the above-mentioned problem cannot occur.

According to the prior art, the problem is more likely to arise in the following situation. At least two tanks 2-5 are freely connected to a manifold 1 without a valve. The two tanks 2-5 have different respective thermal characteristics and/or dimensions. Thus, when there is a thermal variation, for example due to exposure to sunlight or a variation in temperature for any other reason, the pressure within one tank 2-5 changes differently from the pressure within another tank 2-5.

After filling or emptying, there follows a period of heat exchange between the tanks 2-5 and the ambient air, and between the manifold 1 and the ambient air. At the end of this exchange, the internal pressure is different between the manifold 1 and the tanks 2-5. As a result, the pressure difference across the terminals of the solenoid valve 18 is different between the tanks 2-5 with different respective thermal characteristics and/or dimensions. Following an emptying command, the opening of the solenoid valves 18 with the greatest pressure difference is prevented or impeded.

According to the disclosure, the manifold 1, by virtue of its non-return valves 11, 12, 15, 16, allows pressure sectors to be partitioned off in each branch pipe 10, 14. Thus, by connecting only tanks 2-5 with similar thermal characteristics to the same branch pipe 10, 14, the problem is avoided.

Thus, according to another feature, a series of tanks, i.e. the tanks 2-5 connected to the same branch pipe 10, 14, advantageously groups tanks 2-5 with similar thermal characteristics together.

What is meant here by thermal characteristics is any characteristic that can, actively or passively, lead to a change in pressure within a tank 2-5.

By way of example, tanks 2-5 with similar thermal characteristics, advantageously grouped within the same series, are tanks with similar dimensions. These dimensions can be selected differently. When subjected to a change in temperature, tanks of the same diameter, length, volume or exchange surface, selected as desired, exhibit a comparable change in pressure, and are thus potentially usable together, allowing the solenoid valves 18 to operate correctly. These different dimensional criteria, within a given temperature range, can be used to group tanks 2-5 together in a series connected to the same branch pipe 10, 14.

More precisely, according to a preferred criterion, the diameter-to-length ratio of the tank 2-5 is used to group tanks 2-5 together within a series.

There are multiple possible embodiments for the manifold 1.

According to a first embodiment, more particularly illustrated in FIGS. 1, 2 and 4, a manifold 1 is made in one piece.

In another embodiment, more particularly illustrated in FIG. 3, a manifold 1 is of modular design, with a base module 20 and at least one add-on module 21. By adding add-on modules 21, as many additional branch pipes 14 can be added as required.

The base module 20 comprises a filling pipe 8, an emptying pipe 9 and a first branch pipe 10. The filling pipe 8 comprises a connection to the filling inlet 6, a connection to the inlet of the first branch pipe 10, and a first upstream extension connection 22. The emptying pipe 9 comprises a connection to the outlet of the first branch pipe 10, a connection to the emptying outlet 7, and a first downstream extension connection 23. The first branch pipe 10 is unchanged from the preceding description. It comprises a first upstream non-return valve 11, a second downstream non-return valve 12 and at least one first tank connection 13, between the two valves 11, 12.

An add-on module 21 comprises a second branch pipe 14, unchanged from the preceding description. It comprises a second upstream non-return valve 15, a second downstream non-return valve 16 and at least one second tank connection 17, between the two valves 15, 16. An add-on module 21 further comprises, at its inlet, a second upstream extension connection 24 complementary to the first upstream extension connection 22, so as to be able to connect it thereto, creating a fluid connection. Similarly, at its output, an add-on module 21 comprises a second downstream extension connection 25 complementary to the first downstream extension connection 23, so as to be able to connect it thereto, creating a fluid connection.

In the case of multiple add-on modules 21, the upstream connection 24 or the downstream connection 25 of a preceding add-on module 21 is connected to the upstream connection 24 or the downstream connection 25 of a subsequent add-on module 21. The add-on modules 21 are connected in parallel.

According to another feature, a branch pipe 10, 14 comprises a pressure sensor 26. Such a pressure sensor 26 is used for control purposes for filling and/or emptying, or for safety purposes, to check that the pressure does not become too high.

The disclosure has been illustrated and described in detail in the drawings and the preceding description. This must be considered as illustrative and given by way of example and not as limiting the disclosure to this description alone. Many alternative embodiments are possible.

LIST OF REFERENCE SIGNS

1: manifold,
2-5: tank,
6: filling inlet,
7: emptying outlet,
8: filling pipe,
9: emptying pipe,
10: first branch pipe,
11: first upstream non-return valve,
12: first downstream non-return valve,
13: first tank connection,
14: second branch pipe,
15: second upstream non-return valve,
16: second downstream non-return valve,
17: second tank connection,
18: solenoid valve,
20: base module,
21: add-on module,
22: first upstream extension connection,
23: first downstream extension connection,
24: second upstream extension connection,
25: second downstream extension connection,
26: pressure sensor.

The invention claimed is:

1. A hydraulic manifold that fluidly connects at least two series of tanks, the hydraulic manifold comprising:
at least one filling inlet and at least one emptying outlet;
a filling pipe;
an emptying pipe; and
a same number of branch pipes as there are series of tanks, and wherein the branch pipes comprise at least a first branch pipe and a second branch pipe, and wherein the series of tanks comprise at least a first series and a second series;
wherein the filling pipe comprises a connection to said at least one filling inlet and a connection to an inlet of each of the branch pipes;
wherein the emptying pipe comprises a connection to an outlet of each of the branch pipes and a connection to said at least one emptying outlet;
the first branch pipe comprising, at a first branch pipe inlet, a connection to the filling pipe, via a first upstream non-return valve, going in a direction from the filling pipe to the first branch pipe and, at a first branch pipe outlet, a connection to the emptying pipe via a first downstream non-return valve, going in a direction from the first branch pipe to the emptying pipe and further comprising, between the first upstream non-return valve and the first downstream non-return valve, at least one first connection to a tank of the first series; and
the second branch pipe comprising, at a second branch pipe inlet, a connection to the filling pipe via a second upstream non-return valve, going in a direction from the filling pipe to the second branch pipe and, at a second branch pipe outlet, a connection to the emptying pipe via a second downstream non-return valve, going in a direction from the second branch pipe to the emptying pipe and further comprising, between the second upstream non-return valve and the second downstream non-return valve, at least one second connection to a tank of the second series.

2. The hydraulic manifold as claimed in claim 1, wherein each of said tank is connected to the hydraulic manifold via a semi-direct solenoid valve.

3. The hydraulic manifold as claimed in claim 1, wherein, within said series of tanks, tanks with similar thermal characteristics are grouped together.

4. The hydraulic manifold as claimed in claim 3, wherein said tanks with similar thermal characteristics are tanks with substantially identical diameter-to-length ratios.

5. The hydraulic manifold as claimed in claim 1, wherein the hydraulic manifold is made in one piece, since the hydraulic manifold is assembled together.

6. The hydraulic manifold as claimed in claim 1, of modular design, with a base module and at least one add-on module:

the base module comprising the filling pipe, the emptying pipe and the first branch pipe, the filling pipe comprising the connection to the filling inlet, the connection to the first branch pipe inlet of the first branch pipe, and a first upstream extension connection, the emptying pipe comprising the connection to the first branch pipe outlet of the first branch pipe, the connection to the emptying outlet, and a first downstream extension connection, the first branch pipe being unchanged, and the at least one add-on module comprising the second branch pipe, wherein the second branch pipe is unchanged, and further comprising, at the second branch pipe inlet, a second upstream extension connection complementary to the first upstream extension connection and, at the second branch pipe outlet, a second downstream extension connection complementary to the first downstream extension connection.

7. The hydraulic manifold as claimed in claim 1, wherein at least one of the first branch pipe and the second branch pipe comprises a pressure sensor.

* * * * *